US012493708B2

(12) United States Patent
Sirohi et al.

(10) Patent No.: US 12,493,708 B2
(45) Date of Patent: Dec. 9, 2025

(54) VISIBILITY STATISTIC COMPUTATION AND APPLICATION IN THE CONTEXT OF A HYBRID SHARING MODEL WITHIN A DATABASE SYSTEM

(71) Applicant: Salesforce, Inc., San Francisco, CA (US)

(72) Inventors: Arjun Kumar Sirohi, Meerut (IN); Mayank Agarwal, Siliguri (IN)

(73) Assignee: Salesforce, Inc., San Francisco, CA (US)

( * ) Notice: Subject to any disclaimer, the term of this patent is extended or adjusted under 35 U.S.C. 154(b) by 74 days.

(21) Appl. No.: 18/594,828

(22) Filed: Mar. 4, 2024

(65) Prior Publication Data

US 2025/0272421 A1    Aug. 28, 2025

(51) Int. Cl.
*G06F 21/62* (2013.01)
*G06F 16/2455* (2019.01)

(52) U.S. Cl.
CPC .... *G06F 21/6218* (2013.01); *G06F 16/24553* (2019.01)

(58) Field of Classification Search
CPC ............. G06F 21/6218; G06F 16/24553
USPC ........................................ 726/27
See application file for complete search history.

(56) References Cited

U.S. PATENT DOCUMENTS

| 7,779,039 B2 * | 8/2010 | Weissman | G06F 16/284 |
| | | | 707/793 |
| 10,936,587 B2 | 3/2021 | Sirohi et al. | |
| 11,216,460 B2 * | 1/2022 | Hay | G06F 16/2379 |
| 11,249,995 B2 | 2/2022 | Sirohi et al. | |
| 11,270,009 B2 * | 3/2022 | Friedman | G06F 21/6245 |
| 11,392,960 B2 * | 7/2022 | Copeland | G06F 40/177 |
| 11,416,484 B2 * | 8/2022 | Sirohi | G06F 16/24535 |
| 11,443,264 B2 * | 9/2022 | Copeland | G06Q 10/063114 |
| 11,481,785 B2 * | 10/2022 | Copeland | G06F 9/44526 |
| 11,573,960 B2 * | 2/2023 | Li | G06F 16/24553 |
| 12,135,712 B2 * | 11/2024 | Ramesh | G06F 16/24552 |
| 2007/0073657 A1 * | 3/2007 | Santosuosso | G06F 16/24539 |

(Continued)

OTHER PUBLICATIONS

"Extensible data security policies," Finance & Operations, Dynamics 365, Aug. 9, 2023, Retrieved from the Internet: https://learn.microsoft.com/en-us/dynamics365/fin-ops-core/dev-itpro/sysadmin/extensible-data-security-policies.

(Continued)

*Primary Examiner* — Tauqir Hussain
(74) *Attorney, Agent, or Firm* — Polygon IP, LLP

(57) ABSTRACT

An entity-level visibility statistic may be determined for a database entity in a database system based on one or more visibility rules providing access to instances of the database entity to one or more user accounts. A user-level visibility statistic quantifying a set of instances of the database entity accessible to a user account via the one or more visibility rules may be determined based at least in part on the entity-level visibility statistic. A request may be received by the user account to execute an input database query retrieving one or more of the instances of the database entity. A database object retrieval query including two or more data security subqueries evaluating accessibility of the one or more instances of the database entity and positioned based at least in part on the user-level visibility statistic may be determined based on the input database query.

18 Claims, 8 Drawing Sheets

(56) References Cited

U.S. PATENT DOCUMENTS

| | | | |
|---|---|---|---|
| 2014/0149392 A1* | 5/2014 | Wang | G06F 16/93 |
| | | | 707/722 |
| 2018/0143858 A1* | 5/2018 | Sanjabi | G06F 9/5061 |
| 2018/0189348 A1* | 7/2018 | Sirohi | G06F 16/24539 |
| 2018/0189349 A1* | 7/2018 | Sirohi | G06F 16/24539 |
| 2019/0342088 A1* | 11/2019 | Eidson | H04L 9/14 |
| 2020/0097574 A1* | 3/2020 | Hay | G06F 16/24561 |
| 2020/0097680 A1* | 3/2020 | Hay | G06F 21/6263 |
| 2020/0364669 A1* | 11/2020 | Hay | G06Q 10/103 |
| 2020/0401708 A1* | 12/2020 | Friedman | G06F 21/6245 |
| 2021/0109929 A1* | 4/2021 | Sirohi | G06F 16/24535 |
| 2022/0247678 A1* | 8/2022 | Atwal | H04B 7/18519 |
| 2025/0071191 A1* | 2/2025 | Li | H04L 67/63 |

OTHER PUBLICATIONS

Balbudhe, Kalyani, "Fusion Applications Role-Based Access Control (RBAC)," Oracle Fusion Training & Fusion ELearning, May 1, 2015.

\* cited by examiner

VISIBILITY STATISTIC COMPUTATION AND APPLICATION IN THE CONTEXT OF A HYBRID SHARING MODEL WITHIN A DATABASE SYSTEM

CROSS-REFERENCE TO RELATED APPLICATIONS

This patent application claims priority to Indian Patent Application number 202411013149, filed Feb. 23, 2024 by Sirohi and Agarwal, titled "VISIBILITY STATISTIC COMPUTATION AND APPLICATION IN THE CONTEXT OF A HYBRID SHARING MODEL WITHIN A DATABASE SYSTEM", which is hereby incorporated by reference in its entirety and for all purposes.

FIELD OF TECHNOLOGY

This patent application relates generally to data processing, and more specifically to accessing shared data.

BACKGROUND

Users' access to data in cloud-hosted applications is controlled by access control policies and rules. Such policies and rules may be materialized into share tables that record access to particular types of records. For instance, when a user of a cloud-hosted application relying on a database system attempts to open a record, run a report, access a list view, or search for data using the user interface or API, the system may check the configuration of its record access features to determine which records the user can access. These configurations can be elaborate, especially in large organizations with hundreds of hierarchy nodes, thousands of sharing rules, millions of data rows, and portals for customers and business partners.

Processing such dissimilar data and complex relationships may require a significant amount of time. Accordingly, rather than applying every sharing rule, traversing all hierarchies, and analyzing record access inheritance in real time, the cloud-hosted application may calculate record access data at particular moments, such as when configuration changes occur. The calculated results may then be persisted in a way that facilitates rapid scanning and minimizes the number of database table joins necessary to determine record access at run time.

BRIEF DESCRIPTION OF THE DRAWINGS

The included drawings are for illustrative purposes and serve only to provide examples of possible structures and operations for the disclosed inventive systems, apparatus, methods, and computer program products for database system optimization. These drawings in no way limit any changes in form and detail that may be made by one skilled in the art without departing from the spirit and scope of the disclosed implementations.

DETAILED DESCRIPTION

Figure 1:
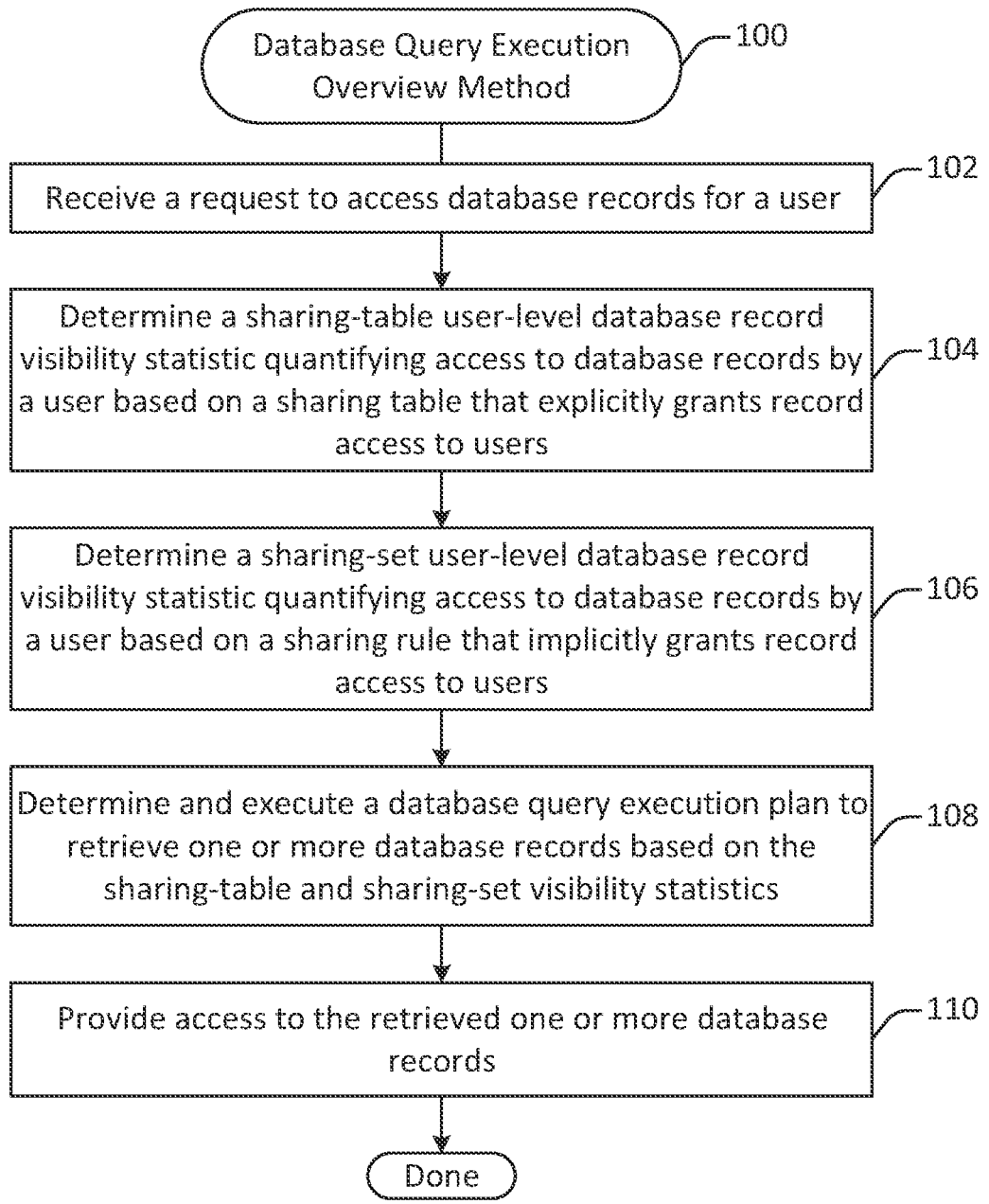
FIG. 1 illustrates an example of a method for executing a database query, performed in accordance with one or more embodiments.

Techniques and mechanisms described herein provide for improvements to database system performance through computation of visibility statistics characterizing access to records associated with cloud-hosted applications. Database user accounts are provided with permission to access database records through various sharing rules. Some sharing rules may be materialized, and hence associated with one or more sharing records in one or more database sharing records that explicitly link database user accounts with database records for the purpose of granting permission. Other sharing rules may be unmaterialized, and hence define criteria that, when satisfied, grant database user accounts access to database records. The database system may periodically compute visibility statistics that quantify one or more types of records accessible to one or more database user accounts under one or more sharing rules. Techniques and mechanisms described herein provide for the computation of such visibility statistics in a manner that, in many situations, is much more efficient in comparison to conventional techniques. Accordingly, such techniques provide for improved performance of the computing system in which the database system is implemented.

In some embodiments, visibility statistics may first be computed for an intermediate layer that lies between a user and a type of database record to which the user has access. For example, in the case of a materialized sharing rule, visibility statistics may first be computed for usergroups in which various users may be members. As another example, in the case of unmaterialized sharing rules, visibility statistics may first be computed for various values of sharing rule attribute targets that define criteria through which access to database records is granted.

In some embodiments, visibility statistics may then be computer on a per-user basis based at least in part on the visibility statistics computed for the intermediate layers. For example, in the case of a materialized sharing rule, the number of accessible records of a particular record type may be approximated as the sum of the number of records to which the database user account has direct access and the numbers of records to which the database user account has access through a usergroup in which the database user account is a member. As another example, in the case of an unmaterialized sharing rule, the number of accessible records of a particular record type may be determined based on the sharing rule attribute target values satisfied by the database user account.

In some embodiments, visibility statistics for materialized and/or unmaterialized share rules may be used to guide query optimization decisions when determining query execution plan. For example, the system may receive a database query requesting access to database records of a particular type by a database account. Permission to access the database records may be provided by two or more different sharing rules, each of which may be materialized or unmaterialized. Different sharing rules may be associated with different database record access subqueries that restrict the database records to which access is provided to those that the database user account has permission to access under the sharing rules. By accessing visibility statistics computed in accordance with techniques and mechanisms described herein, the system may prioritize the execution of those subqueries (e.g., through relative placement in a query execution plan).

As an example, suppose that a first database record access subquery associated with a first visibility statistic indicated that a first associated sharing rule provided access to more database records of the requested type than the number of database records of the requested type accessible to the database user account via a second sharing rule (e.g., by comparing the first visibility statistic with a second visibility statistic associated with the second sharing rule and a second database record access subquery). In such a situation, the first database record access subquery may be placed first in a query execution plan. Then, if the first database record access subquery provides access to a sufficient number of records, the second database record access subquery need not be executed at all.

The database optimization techniques discussed in the previous paragraph rely on database record visibility statistics. However, when using conventional techniques, the computation of such visibility statistics scales poorly as the database size increases. Techniques and mechanisms described herein provide for improved efficiency when determining database record visibility statistics.

According to various embodiments, conventional models of data access control work can work well in some configurations when data access rules have been computed in advance. However, in some cloud computing configurations, not all data access rules may not necessarily be materialized. For instance, users may be given additional access to records using unmaterialized sharing rules such as sharing sets, which are data access rules that are NOT computed and materialized in advance.

According to various embodiments, such changes may result in a user's access to records, termed "visibility," coming from a combination of materialized shares in share tables and un-materialized rules such as sharing sets. Another example of an unmaterialized sharing is the implementation of a "no child implicit" rule in which a user's access to child entity records (e.g., Case, Contact, Opportunity) of a given Account is not materialized into share tables but rather evaluated at run time.

According to various embodiments, in terms of database SQL queries, the security block that checks a user's access for data records in entity tables using sub-queries, may need to make this check not only against the share tables (e.g., for materialized share rows), but also needs against the un-materialized share rule(s). Such a configuration is referred to herein as a hybrid sharing model where, at run time, a user's access to data records needs to be checked against materialized share rows as well as against one or more un-materialized share rules.

According to various embodiments, a hybrid sharing model may give rise to a need for additional types of user visibility statistics for data access control queries. For example, "no child implicit" visibility statistics for each user may need to be pre-computed. Similarly, visibility from sharing sets may need to be pre-computed for a user who has been granted access to data records via a sharing set definition on an entity.

According to various embodiments, since the security block in the SQL query may now include multiple sub-queries which can grant access to a user, performance of the query may be impacted, sometimes severely, for instance if the user's visibility comes from the security subquery placed last. That is, the database may need to evaluate the sub-queries placed first within the security block and upon not finding requisite data access, it may then need to evaluate subsequent sub-queries in the security block to identify the data access for the user.

According to various embodiments, the system may generate and store user visibility statistics for un-materialized share rules in addition to user visibility statistics for materialized sharing rules. Examples of un-materialized share rules include, but are not limited to, the "sharing sets" and "no child implicit" rules discussed herein. These user visibility statistics may be computed in a manner that provides methods for query generation code to optimize SQL queries for performance. For instance, the query generation code may query the user visibility statistics for materialized shares and/or un-materialized share rules, compare these visibility statistics, and based on the comparison, place the security subqueries in the order that will result in improved performance of the SQL query. Such query performance optimization may rely on the collection and use of user visibility statistics to conditionally place data security sub-queries, both materialized and non-materialized rules, within the security block.

Conventional techniques for collecting user visibility statistics involve executing queries against entity tables, group membership tables, and share tables for every user. Such statistics are needed for each user and for each database record type to provide for efficient query execution plan determination. Because a database tenant can have, for instance, millions of users and thousands of entities, enormous amounts of computation and database resources may be needed to compute these user visibility statistics. Moreover, new records may be being created and deleted on a daily basis, exacerbating the costs. Additionally, frequent changes to sharing rules and group memberships cause these user visibility statistics to become stale very quickly, thus necessitating frequent (e.g., daily) computation of such visibility statistics. Under such conditions, the computation of user visibility statistics may fail to complete, leading to user visibility statistics becoming stale and incorrect, which in turn leads to un-optimized queries to be generated by the query optimizer. Un-optimized queries can lead to increased database resources and poor user experience due to increased execution times, which can lead to user dissatisfaction.

In contrast with these conventional techniques, various embodiments of techniques and mechanisms described herein provide for significantly improved database system performance. For example, the computation of user visibility statistics may be streamlined, leading to significantly decreased resource utilization. As another example, the efficient computation of user visibility statistics may lead to user visibility statistics being updated more frequently, which may lead to significant efficiency improvements in query plan determination and hence in the execution of database queries in the database system.

For instance, consider the example of Alexandra, a user of an on-demand database system. When configured in accordance with conventional techniques, the system may periodically compute visibility statistics for Alexandra to identify the numbers of various types of database records accessible to Alexandra under various types of access control policies. However, because such computation is expensive, Alexandra's visibility statistics may frequently be outdated and inaccurate. Accordingly, Alexandra's database queries may be poorly optimized and run slowly when executed by the database system, leading to a poor user experience when Alexandra accesses an application built on data stored in the database system.

Suppose instead that the database system is configured in accordance with techniques and mechanisms described herein. The improved computational efficiency provided by the updated visibility statistic computation may facilitate the frequent calculation of accurate visibility statistics for Alexandra. Such statistics may lead to efficient query execution plans for Alexandra's database queries, which may in turn lead to reduced query execution time and an improved user experience.

According to various embodiments, techniques and mechanisms described herein may provide for significantly improved efficiency of the database system itself. That is, the database system may perform query execution more efficiently and with significantly fewer computation resources when configured with these techniques in comparison with conventional techniques. Although the visibility statistics computed in accordance with these techniques may in some instances be less accurate, they may nevertheless lead to substantial computational gains by facilitating accurate query optimization for the large majority of database queries.

FIG. 1 illustrates an example of a method 100 for executing a database query, performed in accordance with one or more embodiments. In some embodiments, the method 100 may be executed at a database system such as the database system 200 shown in FIG. 2.

A request to access database records for a user is received at 102. In some embodiments, the request may be received in the context of an application supported by database stored in the database system. For instance, the application may be provided in the context of a cloud computing application that relies on such data.

At 104, a sharing-table user-level database record visibility statistic quantifying access to database records by a user based on a sharing table that explicitly grants record access to users is determined. In some embodiments, such a visibility statistic may be predetermined, for instance on a periodic basis. The visibility statistic may indicate, for instance, a number of records of a given type that the user has access to by virtue of explicit access permission rants specified in the sharing table. Additional details regarding the determination of such visibility statistics is discussed with respect to the method 300 shown in FIG. 3.

At 106, a sharing-set user-level database record visibility statistic quantifying access to database records by a user based on a sharing rule that implicitly grants record access to users is determined. In some embodiments, such a visibility statistic may be predetermined, for instance on a periodic basis. The visibility statistic may indicate, for instance, a number of records of a given type that the user has access to by virtue of a rule that grants access to database records to users that meet a designated one or more criteria. Additional details regarding the determination of such visibility statistics is discussed with respect to the method 400 shown in FIG. 4.

At 108, a database query execution plan to retrieve one or more database records based on the sharing-table and sharing-set visibility statistics is determined and executed. In some embodiments, the query execution plan may be determined at least in part by a query optimizer. The query optimizer may decide, for instance, whether to prioritize the sharing-table or sharing-set rules in prioritizing database record access subqueries within the database query execution plan. Additional details regarding the determination and execution of the database query execution plan are discussed with respect to the method 500 shown in FIG. 5.

Access to the retrieved one or more database records is provided at 110. In some embodiments, access may be provided in the context of an application supported by the database system. For instance, access may be provided through an application that facilitates customer service operations, customer sales operations, customer relations management (CRM) applications, or other such business applications.

Figure 2:
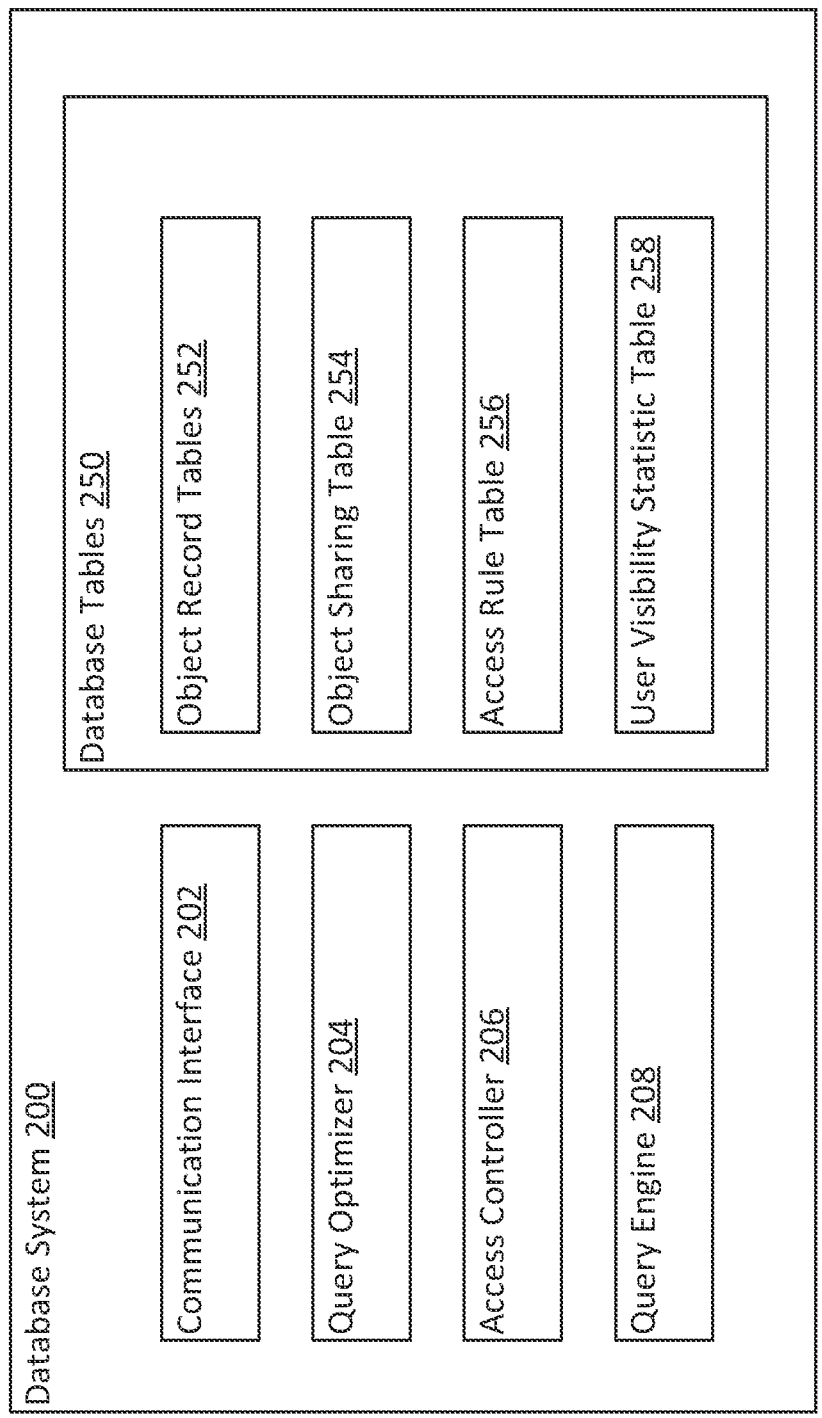
FIG. 2 illustrates a database system, configured in accordance with one or more embodiments.

FIG. 2 illustrates a database system 200, configured in accordance with one or more embodiments. The database system 200 includes a communication interface 202, a query optimizer 204, an access controller 206, a query engine 208, and database tables 250. The database tables 250 include one or more object record tables 252, an object sharing table 254, an access rule table 256, and a user visibility statistic table 258.

According to various embodiments, the database system 200 may be configured to execute one or more methods described herein, such as the methods shown in FIG. 1, FIG. 3, FIG. 4, and FIG. 5. The database system 200 may include other elements not shown in FIG. 2. Alternatively, or additionally, the database system 200 may be incorporated into an on-demand database system that includes other elements, such as application servers configured to provide web applications via a network. Examples of such devices and systems are discussed with respect to FIG. 6, FIG. 7A, FIG. 7B, and FIG. 8.

In some implementations, the communication interface 202 may be configured to receive and respond to requests to retrieve database records. For example, the communication interface 202 may be configured to expose an application procedure interface (API) for submitting database record requests. Such an API may be used by application servers to request database records for retrieval. The communication interface 202 may then provide access to retrieved database records via response messages.

In some embodiments, the query optimizer 204 determines database query execution plans for database request. For instance, a request message may identify one or more criteria for selecting one or more types of database records from the object record tables 252. The query optimizer may convert such criteria into specific instructions to be executed by the query engine 208. A database query execution plan produced by the query optimizer 204 may in some instances be stored for later use, for example if a similar database record request is received in the future.

In some implementations, the access controller 206 is configured to facilitate restricted access to the database records based on one or more rules or permissions. For instance, the access controller 206 may be configured to determine user visibility statistics. Such statistics may be determined dynamically or may be predetermined, for instance on a periodic basis. Such statistics may be stored in the user visibility statistic table 258 for later retrieval.

In some embodiments, the access controller 206 may be configured to manage and update database access records. For example, the access controller 206 may facilitate updating the object sharing table 254 and/or the access rule table 256.

In some embodiments, the query engine 208 is configured to execute a database query execution plan to retrieve one or more database records. Executing a database query execution plan may involve executing database subqueries to both identify and retrieve database records as well as to limit the identified and retrieved records to those that a database user account is permitted to access.

According to various embodiments, the database tables 250 may store various numbers, types, and configurations of database tables. Such tables may be configured for multi-tenant and/or individual data storage.

In some embodiments, a database table may be configured to store only a single type of database record. In such a configuration, the object record tables 252 may include a variety of different tables corresponding to different object types. Alternatively, or additionally, a database table in the object record tables 252 may be configured to store multiple types of database records in the same database table, with data definitions stored in a data dictionary being used to link particular data stored in particular data records in the database to particular types of database objects. That is, in a dynamic schema database, different database records in the same database table may correspond to different types of database objects.

In some implementations, the object sharing table 254 may identify materialized sharing rules. A materialized sharing rule may specify that a particular database user account has access to particular database records, types of records, records meeting one or more criteria, or the like. Such a rule may be represented as one or more records in the object sharing table 254.

In some embodiments, the access rule table 256 may identify one or more unmaterialized sharing rules or policies. An unmaterialized sharing rule may indicate a logical rule that provides access to database records in a manner that is not specific to a particular database user account. For example, an unmaterialized sharing rule may indicate that any database user account that has access to a "Case" database object also has access to any child record of that "Case" database object. For example, an unmaterialized sharing rule may indicate that any database user account having an assigned role of "Administrator" has access to all database records of a particular type for the organization associated with the database user account. As yet another example, an unmaterialized sharing rule may indicate that any database user account that created an "Account" database object has access to any child record of that "Account" database object.

Figure 3:
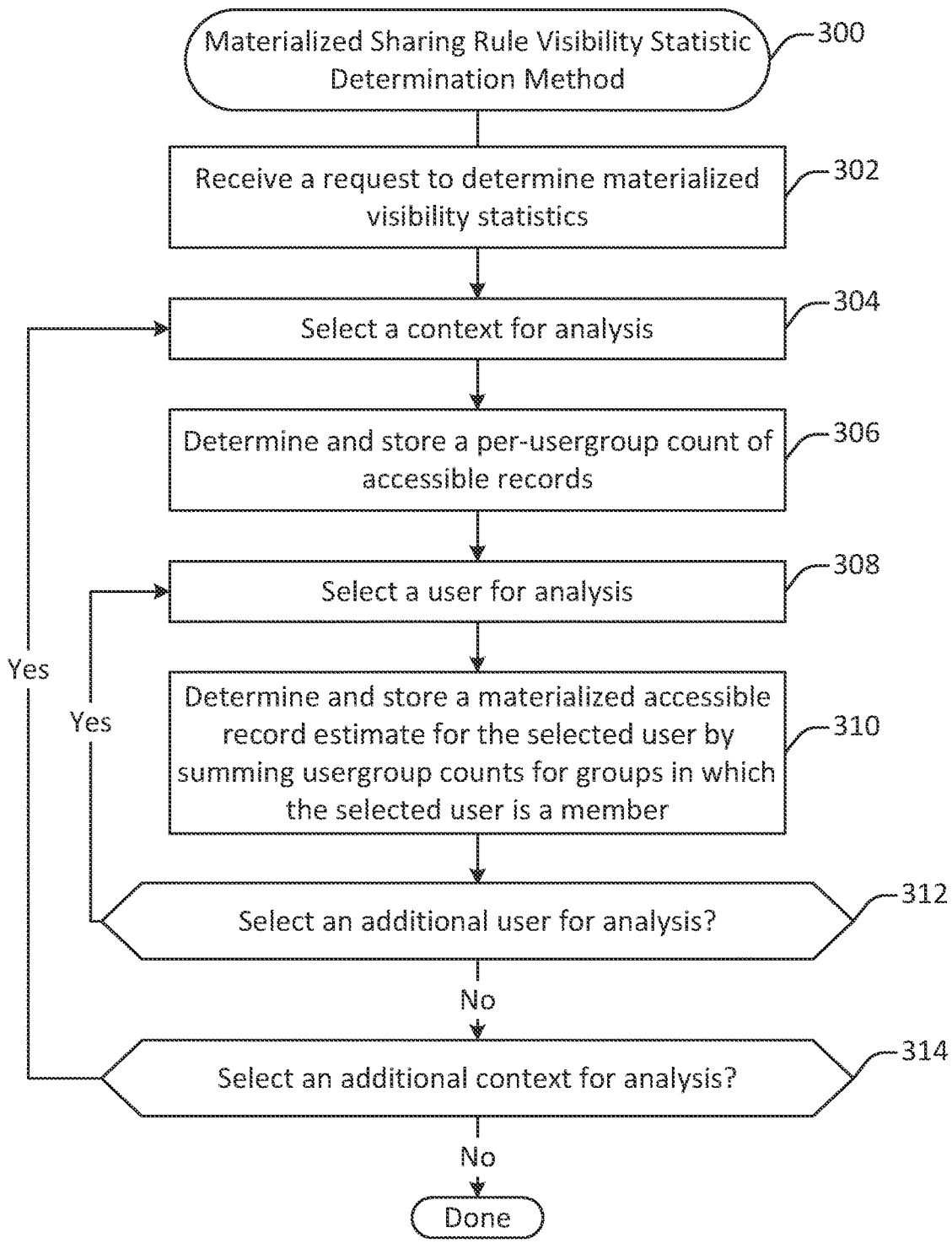
FIG. 3 illustrates a method for determining materialized sharing rule visibility statistics, in accordance with one or more embodiments.

FIG. 3 illustrates a method 300 for determining materialized sharing rule visibility statistics, in accordance with one or more embodiments. According to various embodiments, the method 300 may be performed at a database system such as the database system 200 shown in FIG. 2.

A request to determine materialized visibility statistics is received at 302. In some embodiments, the request may be generated periodically. For instance, materialized visibility statistics may be determined on a periodic basis, such as once per day. Alternatively, or additionally, the request may be generated upon detection of a different triggering condition, such as when a sharing table has been updated to include an updated sharing rule.

A context is selected for analysis at 304. In some embodiments, the context may specify one or more conditions governing the determination of a visibility statistic. For example, the context may specify an identifier for a tenant within a multitenant database environment. As another example, the context may specify a particular type of database object for which to determine visibility statistics, since database access may be specified on the basis of object type.

A per user-group count of accessible records is determined at 306. In some embodiments, the per user-group count may be determined in a way that is specific to the context selected at 304. For instance, the per user-group count may be determined for a particular user group, database tenant, and/or object type.

As a concrete example, conventional techniques for determining user visibility statistics may involve per-user queries, at the cost of potentially many buffer gets per user. For instance, to compute user visibility statistics for a "case" object and a particular database tenant, the system may execute a query such as the following for each database user:

SELECT/*sSharingAllCase.sql: compute_num_visible_nc: 104*/COUNT (*),
NVL (SUM (cnt),0)
FROM (SELECT/*+ordered use_nl (gb s) no_merge*/
    COUNT (*) cnt
    FROM core.direct_group_member dgm, core.group_blowout gb,
    support.case_share s
    WHERE dgm.organization_id='00Dx00000001gK0'
    AND gb.organization_id='00Dx00000001gK0'
    AND s.organization_id='00Dx00000001gK0'
    AND gb.component_ug_id=dgm.ug_id
    AND gb.ug_id=s.ug_id
    AND dgm.member_id='005x0000001SznQ'--key prefix not used
    AND rownum<=100000
    GROUP BY s.cases_id);

In the case of a database tenant having 12,800 users with an average of 1,000 buffer gets per execution per user, a total of 12.8 million total buffer gets may be needed for all users associated with the database tenant.

In contrast, executing a query on a per user-group basis may yield a less accurate but much more computationally efficient execution. For example, instead of executing the query above many times (e.g., for each user associated with the database tenant) for a tenant, the system may instead execute the following query only once for the tenant, at a cost of less than 20,000 buffer gets for the tenant:

INSERT INTO CORE.CASE_SHARE_VIS_STATS
(organization_id, keyprefix, ug_id, cnt)
SELECT '00Dx00000001gK0', '500' AS KeyPrefix,
    s.ug_id, COUNT (*) cnt
FROM support.case_share s
WHERE s.organization_id=100Dx00000001gK0'
GROUP BY s.ug_id;

A user is selected for analysis at 308. In some embodiments, users may be selected in a context-specific manner. For instance, the users associated with database tenant included in the context identified at 304 may be selected. Users may be selected in parallel or in sequence, and in any suitable order.

At 310, a materialized accessible record estimate for the selected user is determined. In some embodiments, the materialized accessible record estimate may provide an estimate of the number of database objects of a designated type (i.e., as defined in the context selected at 304) to which the user has access through materialized sharing rules.

According to various embodiments, the materialized accessible record estimate may be determined by summing the number of database records accessible to each of the user groups in which the selected user is a member. Such counts may be determined as discussed with respect to the operation 306. An example of a query that computes a materialized accessible record estimate for a "case" object type for a user in a tenant organization is as follows:

SELECT/*+index (cc PK_Case_Share_Vis_Stats) SQL-R2d*/SUM (cnt) FROM
CORE.CASE_SHARE_VIS_STATS cc
WHERE cc.organization_id='00Dx00000001gK0'
AND cc.KEYPREFIX='500'
AND cc.ug_id in (SELECT/*+HASH_SJ ORDERED*/ gb.ug_id
FROM core.direct_group_member dgm, core.group_blowout gb
WHERE dgm.organization_id='00Dx00000001gK0'
AND dgm.organization_id=gb.organization_id
AND dgm.ug_id=gb.component_ug_id
AND dgm.member_id='005x0000001SznQ');

In some embodiments, such a count may be overinclusive due to double counting since that the selected user may have access to a record through different user groups. However, the calculation may be very fast. Keeping with the example above, the execution cost may average only 125 buffer gets per execution per user. With this speed, the total cost of computing the user-level estimate of accessible records for database user accounts may be reduced substantially.

A determination is made at 312 as to whether to select an additional user for analysis. According to various embodiments, additional users may continue to be selected until all users for which visibility statistics are needed have been selected. For instance, the system may iterate over all users for a selected database tenant.

A determination is made at 314 as to whether to select an additional context for analysis. In some embodiments, additional contexts may continue to be selected until all contexts for which visibility statistics are needed have been selected. For instance, the system may iterate over all database tenants and all database object types.

Figure 4:
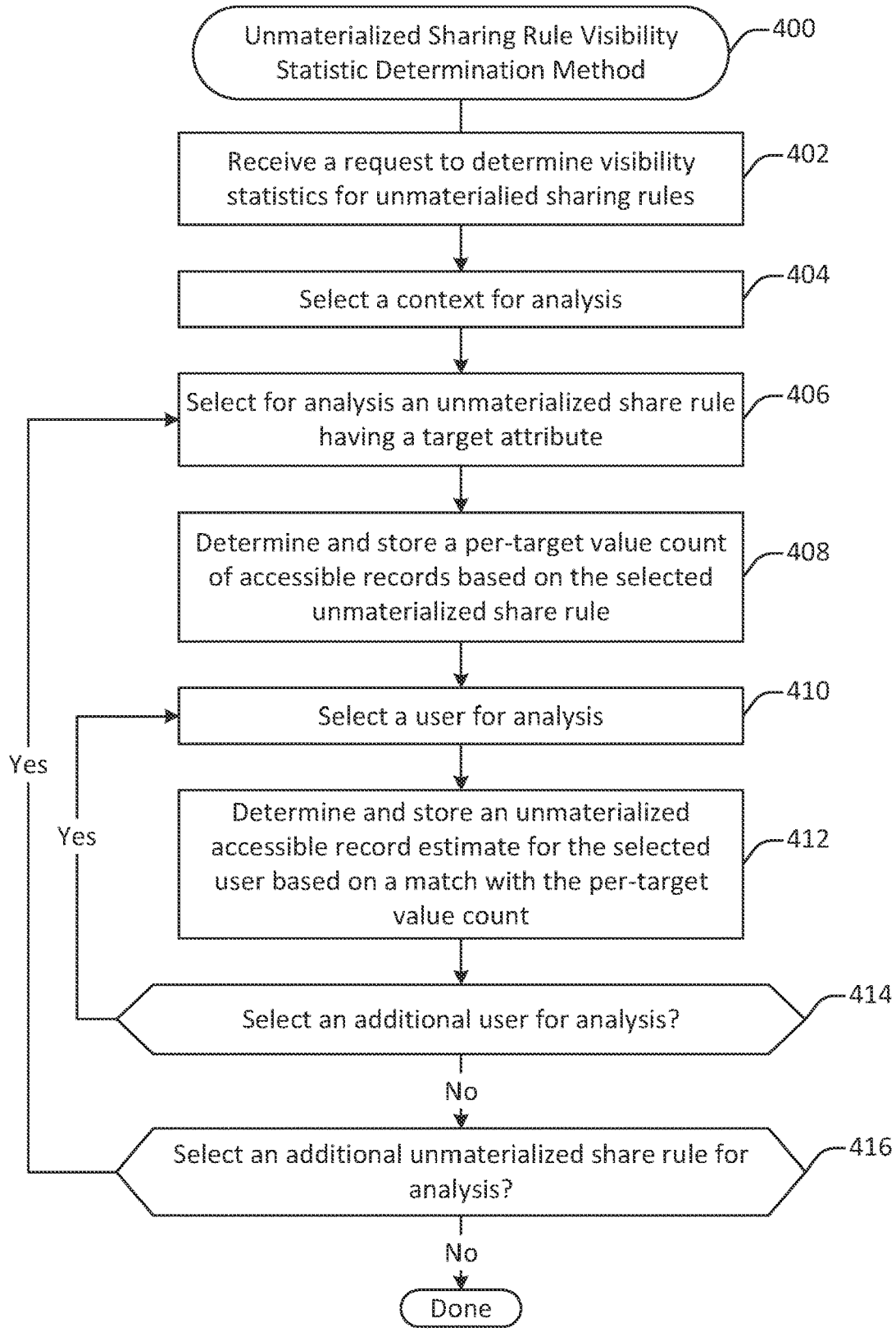
FIG. 4 illustrates a method for determining unmaterialized sharing rule visibility statistics, in accordance with one or more embodiments.

FIG. 4 illustrates a method 400 for determining unmaterialized sharing rule visibility statistics, in accordance with one or more embodiments. According to various embodiments, the method 400 may be performed at a database system, such as the database system 400 shown in FIG. 4.

A request to determine unmaterialized visibility statistics is received at 402. In some embodiments, the request may be generated periodically. For instance, unmaterialized visibility statistics may be determined on a periodic basis, such as once per day. Alternatively, or additionally, the request may be generated upon detection of a different triggering condition, such as when an unmaterialized sharing rule is created or updated.

A context is selected for analysis at 404. In some embodiments, the context may specify one or more conditions governing the determination of a visibility statistic. For example, the context may specify an identifier for a tenant within a multitenant database environment. As another example, the context may specify a particular type of database object for which to determine visibility statistics, since database access may be specified on the basis of object type.

An unmaterialized share rule having a target attribute is selected for analysis at 406. In some embodiments, an unmaterialized share rule may be any rule that provides access to a type of database records based on a target attribute. For example, a sharing set contact-based rule may provide read/write access to a case database object whenever "User: Contact=Case: Owner.Contact". In this example, the target attribute is "Contact", which is an attribute of both the case database object and the user account database object. As another example, a sharing set account-based rule may provide access to a case database object whenever "User: Account=Case: Account". In this example, the target attribute is "Account", which is an attribute of both the case database object and the user account database object.

At 408, a per-target value count of accessible records is determined based on the selected unmaterialized share rule. According to various embodiments, the per-target value count may be determined separately for different values of the target attribute. For instance, in the examples discussed in the previous paragraph, the count of accessible records may be computed separately for different values of the "Contact" and "Account" attributes. For example, in the case of the sharing set contact-based rule example discussed above, a query such as the following may be used to compute and store the per-target value (i.e., per-case) count.

INSERT INTO CORE.SHARINGSET_VIS_STATS (organization_id,keyprefix,sstargetid, cnt)
SELECT/*+ordered index (c AKCASES_ACCOUNT1) SQL-SS-R2d*/'00Dx00000001gK0'
as organization_id, '001' AS KeyPrefix, c.account_id AS SSTargetId, COUNT (*) AS Cnt
FROM support.cases c
WHERE c.organization_id=100Dx00000001gK0'
AND c.account_id< >1000000000000000'
GROUP BY c.account_id
HAVING COUNT (*)>10;

As another example, in the case of the sharing set account-based rule example, a query such as the following may be used to compute and store the per-target value (i.e., per-account) count.

INSERT INTO CORE.SHARINGSET_VIS_STATS (organization_id,keyprefix,sstargetid,cnt)
SELECT/*+ordered index (c AKCASES_ACCOUNT1) SQL-SS-R2d*/'00Dx00000001gK0'
as organization_id, '001' AS KeyPrefix, c.account_id AS SSTargetId, COUNT (*) AS Cnt
FROM support.cases c
WHERE c.organization_id='00Dx00000001gK0'
AND c.account_id< > '000000000000000'
GROUP BY c.account_id
HAVING COUNT (*)>10;

In some embodiments, queries such as those discussed with respect to operation 408 can be chunked, for instance using primary key chunking on an entity table. Alternatively, or additionally, entity sampling may be used, for instance to determine an estimated rather than exact count.

A user is selected for analysis at 410. In some embodiments, user accounts in the database system may be selected for analysis in any suitable order, in sequence or in parallel. For instance, users within a tenant organization may be selected in sequence, at random, or in any suitable ordering.

An unmaterialized accessible record value for the selected user is determined at 412. In some embodiments, the unmaterialized accessible record value may be determined by identifying a count, such as that determined at operation 408, for a target attribute value matching an attribute value for the selected database user account. For example, in the case of the sharing set account-based rule example, a query such as the following may be used to compute and store the per-user value.

SELECT/*+index (ss PK_SHARINGSET_VIS_STATS) */CNT
FROM CORE.SHARINGSET_VIS_STATS ss
WHERE ss.organization_id='00Dx00000001gK0'
AND ss.KEYPREFIX='001' AND ss.SSTARGETID=
  (SELECT u.account_id FROM core.users u
    WHERE u.organization_id='00Dx00000001gK0'
    AND u.profile_id IN ('00ex0000000juEW', '00ex0000000juHt')--The profile ids to which the Sharing Set applies
    AND u.users_id='005x0000001V87C');

As another example, in the case of the sharing set case-based rule example, a query such as the following may be used to compute and store the per-target value (i.e., per-account) count.

SELECT/*+index (ss PK_SHARINGSET_VIS_STATS) SQL-R1a*/CNT
FROM CORE.SHARINGSET_VIS_STATS ss
WHERE ss.organization_id='00Dx00000001gK0'
AND ss.KEYPREFIX='001' AND ss.SSTARGETID=
  (SELECT c.account_id FROM core.users u, sales.contact c
    WHERE u.organization_id='00Dx00000001gK0'
    AND u.organization_id=c.organization_id
    AND u.contact_id=c.contact_id
    AND u.profile_id IN ('00ex0000000juEW', '00ex0000000juHt')--The profile ids to which the Sharing Set applies
    AND u.users_id='005x0000001V87C');

According to various embodiments, the queries discussed in the previous paragraph may be executed in advance for one or more users with the results stored in a table. Alternatively, one or more such queries may be executed dynamically, for instance at run time during the execution of the method 500 shown in FIG. 5.

A determination is made at 414 as to whether to select an additional user for analysis. In some embodiments, users may continue to be selected until all suitable user database accounts have been analyzed. A determination is made at 416 as to whether to select an additional unmaterialized share rule for analysis. In some implementations, additional unmaterialized share rules may continue to be selected until all suitable unmaterialized share rules have been selected for analysis.

Figure 5:
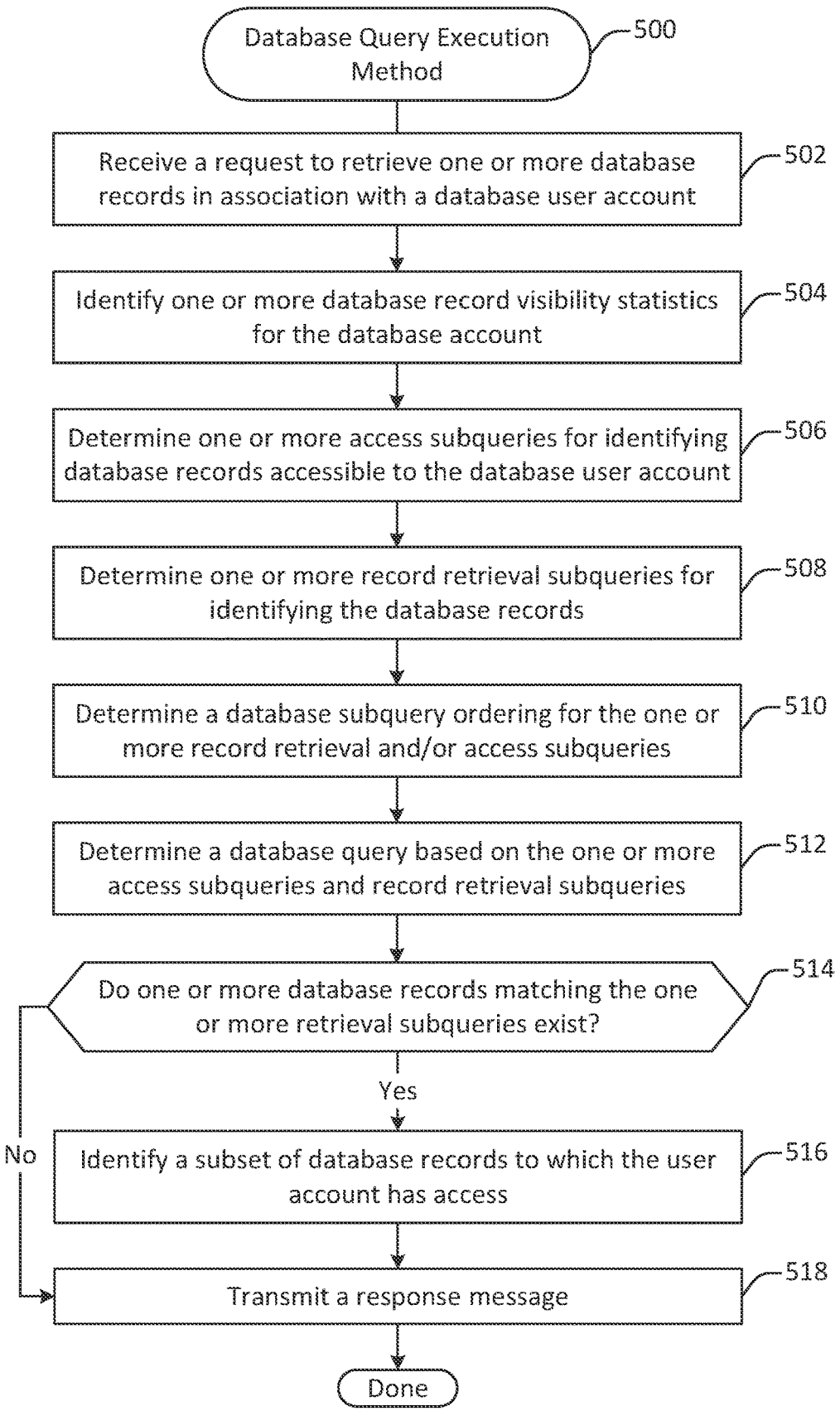
FIG. 5 illustrates a method of executing a database query, performed in accordance with one or more embodiments.

FIG. 5 illustrates a method 500 of executing a database query, performed in accordance with one or more embodiments. The method 500 may be performed on any suitable computing device, such as one or more devices in the database system 200 shown in FIG. 2.

A request to retrieve one or more database records in association with a database user account is received at 502. In some embodiments, the request may be received from a client machine in communication with the database system. Alternatively, the request may be received from an application server executing a web application through which access to the database system is provided. For instance, a client machine may interact with the database system through the web application to access customer relations management, sales management, service management, and/or other types of cloud computing services. The client machine may authenticate to the database system via the database user account.

One or more database record visibility statistics for the database account are identified at 504. In some embodiments, the database record visibility statistics may be determined as discussed with respect to the methods 300 and 400 shown in FIG. 3 and FIG. 4. One or more such database record visibility statistics may be identified by retrieving them from a database table in which they have been stored after being precomputed. Alternatively, or additionally, one or more such database record visibility statistics may be determined dynamically at the time the method 500 is executed.

One or more access subqueries for identifying database records accessible to the database user account are identified at 506. In some embodiments, an access subquery may be a database query portion that restricts a set of records identified or returned by a retrieval subquery to those records a database user account is authorized to access. For example, an access subquery may restrict access to one or more materialized share tables to restrict the retrieved database records to those authorized by a materialized share, as discussed with respect to the method 300 shown in FIG. 3. As another example, an access subquery may restrict access to one or more unmaterialized share tables to restrict the retrieved database records based on account roles and/or other rules, for instance as discussed with respect to the method 400 shown in FIG. 4.

One or more record retrieval subqueries for identifying the database records are determined at 508. According to various embodiments, the one or more retrieval subqueries may include one or more database system instructions, for instance implemented in a language such a structured query language. The one or more retrieval subqueries may be determined by a query plan optimizer, as discussed with respect to FIG. 2.

In some embodiments, the one or more retrieval subqueries may be determined at least in part based on the one or more database record visibility statistics. For instance, the one or more database record visibility statistics may indicate a number of records expected to be obtained. Depending on such information, the one or more retrieval queries may be optimized in various ways. For example, a full table scan may be selected if relatively many records are expected to be retrieved, while an index-based query may be selected if relatively few records are expected to be retrieved.

A database subquery ordering for the one or more record retrieval and/or access subqueries is determined at 510. In some embodiments, the database subquery ordering may determine an order in which the one or more subqueries are to be incorporated into a database query for retrieving the records. This ordering may in turn affect the order in which the subqueries are executed, which may in turn affect the execution efficiency of the database query.

In some embodiments, the database subquery ordering may be determined at least in part based on the database record visibility statistics identified at 504. For instance, the database record visibility statistics may indicate that a user account has access to more records of the designated record type via materialized share rules than for unmaterialized share rules. In such a situation, an access subquery for materialized share rules may be placed before an access subquery for unmaterialized share rules. In some configurations, access queries may be placed in order of the number of records to which they are expected to provide access based on the database record visibility statistics.

A database query is determined at 512. In some embodiments, the database query may be determined by combining the one or more record retrieval subqueries determined at

508 with the one or more access subqueries determined at 506 based on the subquery ordering determined at operation 510.

A determination is made at 514 as to whether one or more database records matching the database retrieval query exist. In some embodiments, the determination may be made based at least in part by executing some or all of the one or more database record subqueries. For instance, the one or more database record subqueries may be executed in the order determined at 510.

Upon determining the one or more database records matching the one or more retrieval subqueries exist, then at 516 a subset of database records to which the user account has access is identified. In some embodiments, the subset may be identified by restricting a set of one or more database records matching the one or more retrieval subqueries to a subset of database records to which the user account has access. The one or more database records may be restricted by executing the one or more access subqueries in the order determined at 510.

In some embodiments, not all database subqueries need be executed. For example, the response to the request may be limited to a designated number of records. Such a limit may be included in the request itself or may be imposed by the system. In such a situation, additional subqueries need not be executed once a number of records matching the request and being accessible to the database user account have been identified. For this reason, ordering the subqueries as discussed with respect to the operation 510 may significantly improve query efficiency by reducing the number of subqueries that are executed.

A response message is transmitted at 518. According to various embodiments, the destination of the response message may depend on the source of the request received at operation 502. For instance, the response message may be sent to a client machine, an application server, or any other suitable recipient. In the event that a nonempty set of database records is identified that both match the request and that are accessible to the database user account, the response message may identify or include such records. Alternatively, in the event that the request does not yield any matching database records to which the database user account has access, the response message may indicate a negative result.

Figure 6:
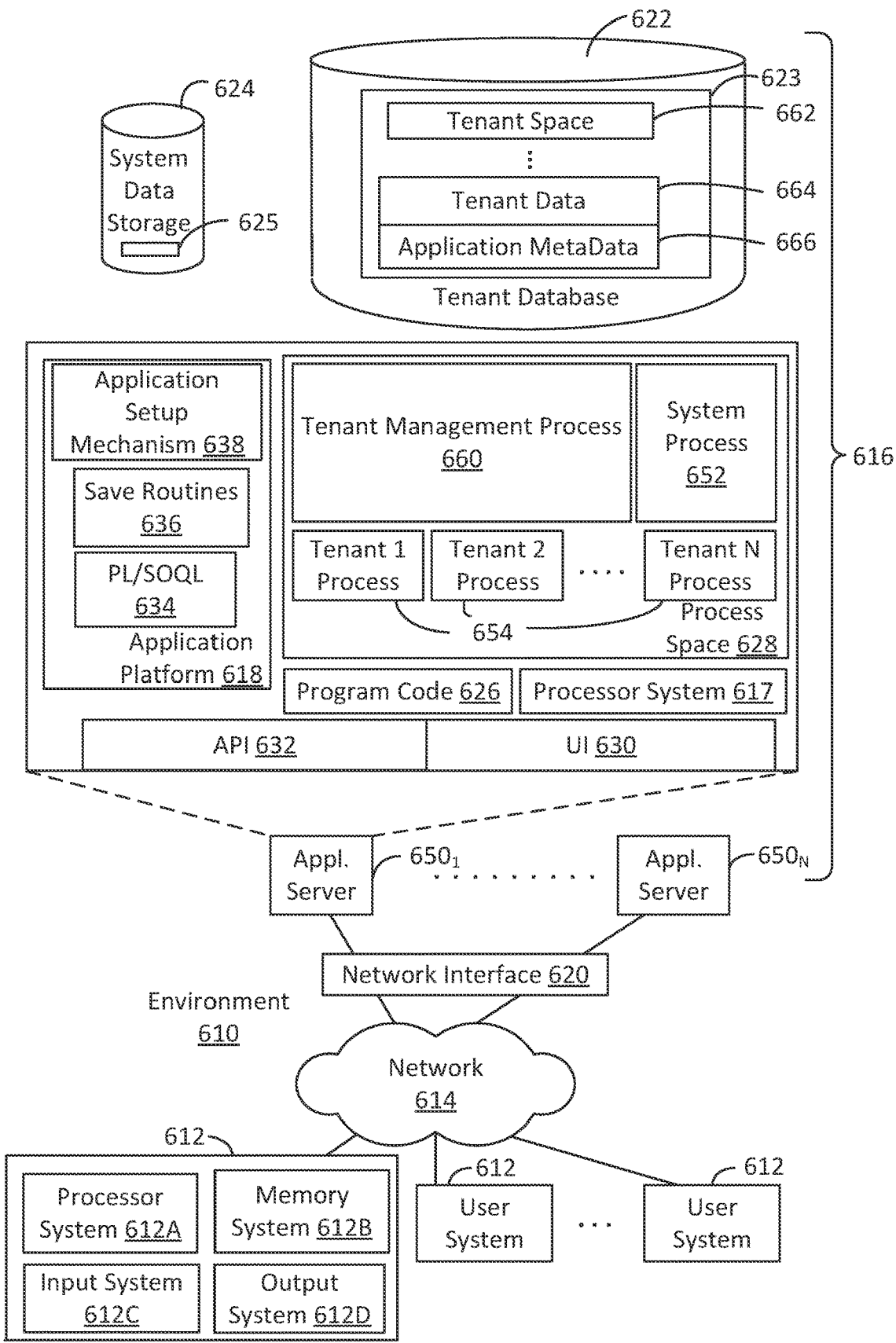
FIG. 6 shows a block diagram of an example of an environment 610 that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based query optimization system. For example, in some implementations, system 616 may include application servers configured to implement and execute various types of software applications. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a query optimizer, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
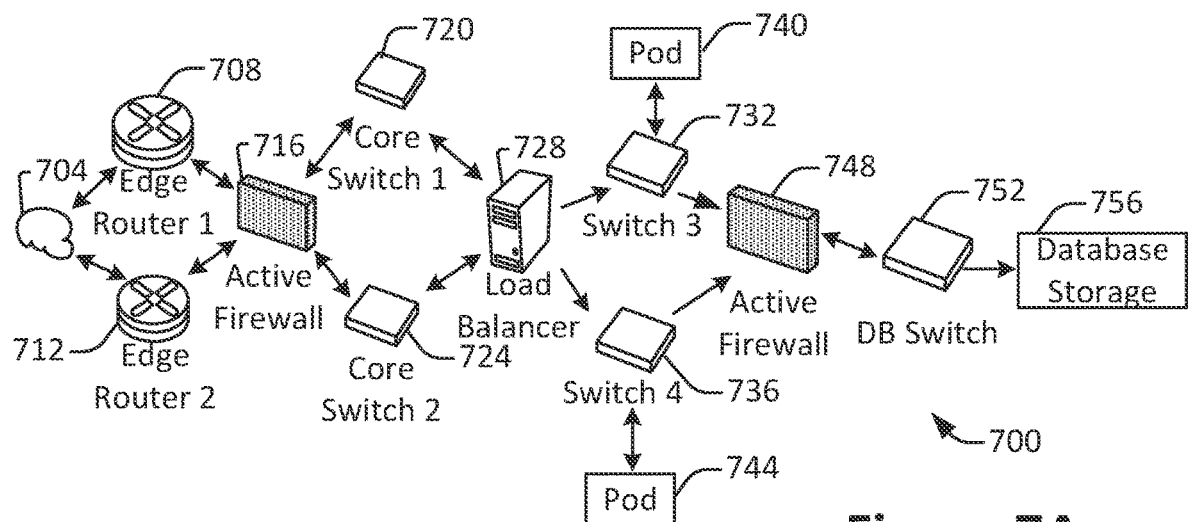
FIG. 7A shows a system diagram of an example of architectural components of an on-demand database service environment 700, configured in accordance with some implementations.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process visibility statistic information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
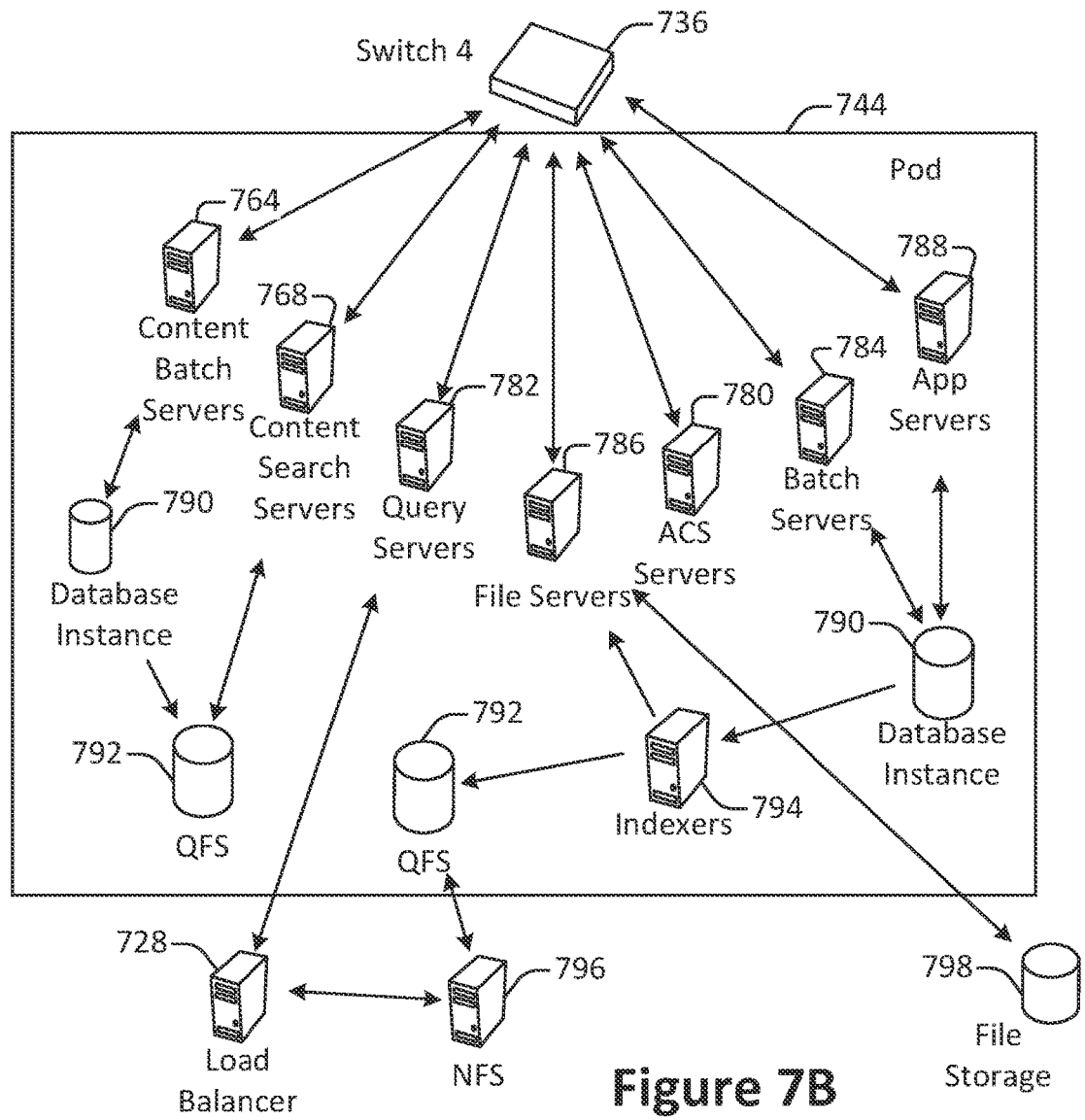
FIG. 7B shows a system diagram further illustrating an example of architectural components of an on-demand database service environment, in accordance with some implementations.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
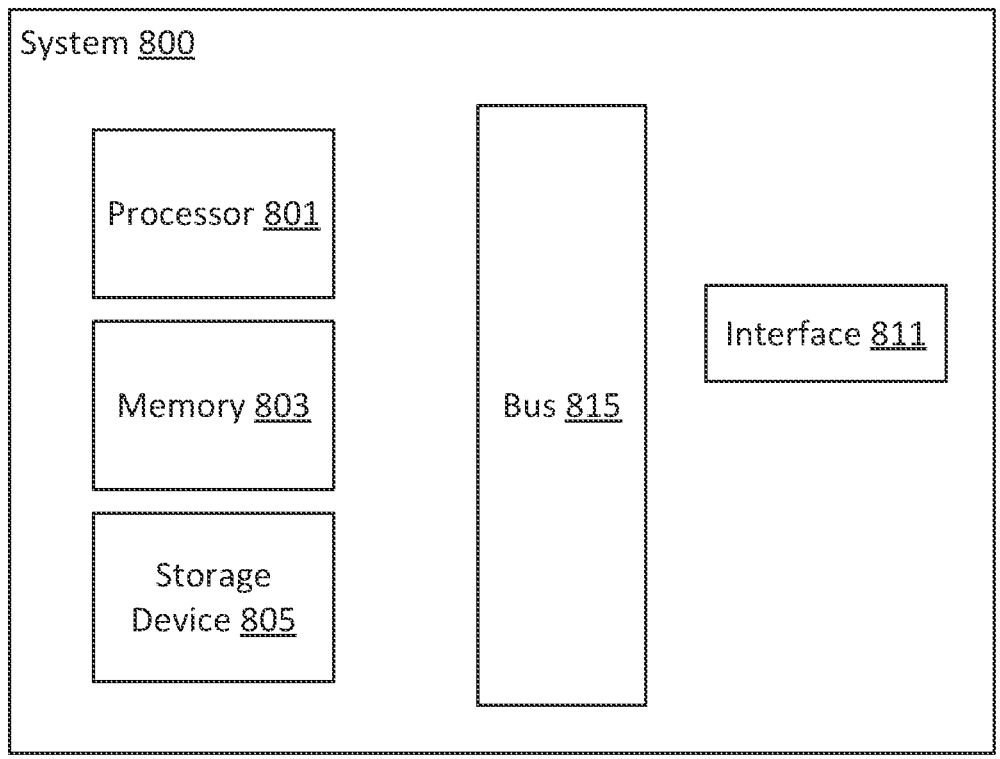
FIG. 8 illustrates one example of a computing device.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of multi-tenant implementations. However, the techniques disclosed herein apply to a wide variety of computing environments, including single-tenant databases. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
    determining an entity-level visibility statistic for a database entity in a database system based on one or more visibility rules providing access to instances of the database entity to one or more user accounts;
    determining a user-level visibility statistic based at least in part on the entity-level visibility statistic, the user-level visibility statistic quantifying a set of instances of the database entity accessible to a user account via the one or more visibility rules;
    receiving a request by the user account to execute an input database query retrieving one or more of the instances of the database entity;
    determining a database object retrieval query based on the input database query and at least in part on first and second user-level visibility statistics, the database object retrieval query including two or more data security subqueries evaluating accessibility of the one or more instances of the database entity, the two or more database security subqueries including a first database security subquery associated with the first user-level visibility statistic and a second database security subquery associated with the second user-level visibility statistic, the two or more database security subqueries being located within the database object retrieval query based at least in part on the user-level visibility statistic; and
    providing access to the one or more instances of the database entity at least in part by executing the database object retrieval query against the database system.

2. The method recited in claim 1, the method further comprising:
    determining a plurality of entity-level visibility statistics for the database entity including the entity-level visibility statistic; and
    determining a plurality of user-level visibility statistics including the user-level visibility statistic, the plurality of user-level visibility statistics each quantifying a respective set of instances of the database entity accessible to the user account, wherein the database object retrieval query is determined based at least in part on the plurality of user-level visibility statistics.

3. The method recited in claim 1, wherein determining the database object retrieval query comprises:
    comparing the first user-level visibility statistic and the second user-level database statistic; and
    selecting the first database security subquery to precede the second database security subquery in the database object retrieval query upon determining based on the comparison that the first database security subquery is predicted to provide access to a relatively larger number of database records than the second database security subquery.

4. The method recited in claim 1, wherein the first database security subquery is associated with a materialized share rule defining one or more share records stored in a record share table in the database system, the one or more share records directly linking the user account with a first set of instances of the database entity accessible to the user account.

5. The method recited in claim 1, wherein the second database security subquery is associated with an unmaterialized share rule defining one or more criteria providing access to a second set of instances of the database entity by the user account.

6. The method recited in claim 5, wherein the user account includes a user account attribute value for an attribute, and wherein the unmaterialized share rule provides access to the second set of instances of the database entity by the user account when the second set of instances of the database entity each includes a respective database entity attribute value that matches the user account attribute value.

7. The method recited in claim 1, wherein the entity-level visibility statistic is predetermined, and wherein retrieving the entity-level visibility statistic comprises retrieving the entity-level visibility statistic from a database table in the database system.

8. One or more non-transitory computer readable media having instructions stored thereon for performing a method, the method comprising:
    determining an entity-level visibility statistic for a database entity in a database system based on one or more visibility rules providing access to instances of the database entity to one or more user accounts;
    determining a user-level visibility statistic based at least in part on the entity-level visibility statistic, the user-level visibility statistic quantifying a set of instances of the database entity accessible to a user account via the one or more visibility rules;
    receiving a request by the user account to execute an input database query retrieving one or more of the instances of the database entity;
    determining a database object retrieval query based on the input database query and at least in part on first and second user-level visibility statistics, the database object retrieval query including two or more data security subqueries evaluating accessibility of the one or more instances of the database entity, the two or more database security subqueries including a first database security subquery associated with the first user-level visibility statistic and a second database security subquery associated with the second user-level visibility statistic, the two or more database security subqueries being located within the database object retrieval query based at least in part on the user-level visibility statistic; and providing access to the one or more instances of the database entity at least in part by executing the database object retrieval query against the database system.

9. The one or more non-transitory computer readable media recited in claim 8, the method further comprising:
determining a plurality of entity-level visibility statistics for the database entity including the entity-level visibility statistic; and
determining a plurality of user-level visibility statistics including the user-level visibility statistic, the plurality of user-level visibility statistics each quantifying a respective set of instances of the database entity accessible to the user account, wherein the database object retrieval query is determined based at least in part on the plurality of user-level visibility statistics.

10. The one or more non-transitory computer readable media recited in claim 8, wherein determining the database object retrieval query comprises:
comparing the first user-level visibility statistic and the second user-level database statistic; and
selecting the first database security subquery to precede the second database security subquery in the database object retrieval query upon determining based on the comparison that the first database security subquery is predicted to provide access to a relatively larger number of database records than the second database security subquery.

11. The one or more non-transitory computer readable media recited in claim 8, wherein the first database security subquery is associated with a materialized share rule defining one or more share records stored in a record share table in the database system, the one or more share records directly linking the user account with a first set of instances of the database entity accessible to the user account.

12. The one or more non-transitory computer readable media recited in claim 8, wherein the second database security subquery is associated with an unmaterialized share rule defining one or more criteria providing access to a second set of instances of the database entity by the user account.

13. The one or more non-transitory computer readable media recited in claim 12, wherein the user account includes a user account attribute value for an attribute, and wherein the unmaterialized share rule provides access to the second set of instances of the database entity by the user account when the second set of instances of the database entity each includes a respective database entity attribute value that matches the user account attribute value.

14. The one or more non-transitory computer readable media recited in claim 8, wherein the entity-level visibility statistic is predetermined, and wherein retrieving the entity-level visibility statistic comprises retrieving the entity-level visibility statistic from a database table in the database system.

15. A database system implemented in a computing system that includes a processor, memory, and a storage device, the database system configured to perform a method comprising:
determining an entity-level visibility statistic for a database entity in a database system based on one or more visibility rules providing access to instances of the database entity to one or more user accounts;
determining a user-level visibility statistic based at least in part on the entity-level visibility statistic, the user-level visibility statistic quantifying a set of instances of the database entity accessible to a user account via the one or more visibility rules;
receiving a request by the user account to execute an input database query retrieving one or more of the instances of the database entity;
determining a database object retrieval query based on the input database query and at least in part on first and second user-level visibility statistics, the database object retrieval query including two or more data security subqueries evaluating accessibility of the one or more instances of the database entity, the two or more database security subqueries including a first database security subquery associated with the first user-level visibility statistic and a second database security subquery associated with the second user-level visibility statistic, the two or more database security subqueries being located within the database object retrieval query based at least in part on the user-level visibility statistic; and
providing access to the one or more instances of the database entity at least in part by executing the database object retrieval query against the database system.

16. The database system recited in claim 15, wherein determining the database object retrieval query comprises:
comparing the first user-level visibility statistic and the second user-level database statistic; and
selecting the first database security subquery to precede the second database security subquery in the database object retrieval query upon determining based on the comparison that the first database security subquery is predicted to provide access to a relatively larger number of database records than the second database security subquery.

17. The database system recited in claim 16, wherein the first database security subquery is associated with a materialized share rule defining one or more share records stored in a record share table in the database system, the one or more share records directly linking the user account with a first set of instances of the database entity accessible to the user account, and wherein the second database security subquery is associated with an unmaterialized share rule defining one or more criteria providing access to a second set of instances of the database entity by the user account, and wherein the user account includes a user account attribute value for an attribute, and wherein the unmaterialized share rule provides access to the second set of instances of the database entity by the user account when the second set of instances of the database entity each includes a respective database entity attribute value that matches the user account attribute value.

18. The database system recited in claim 15, wherein the entity-level visibility statistic is predetermined, and wherein retrieving the entity-level visibility statistic comprises retrieving the entity-level visibility statistic from a database table in the database system.

* * * * *